(12) United States Patent
Mramor

(10) Patent No.: US 6,167,808 B1
(45) Date of Patent: Jan. 2, 2001

(54) INITIATOR FOR AIR BAG INFLATOR

(75) Inventor: Vincent J. Mramor, Chandler, AZ (US)

(73) Assignee: TRW Inc., Lyndhurst, OH (US)

( * ) Notice: Under 35 U.S.C. 154(b), the term of this patent shall be extended for 0 days.

(21) Appl. No.: 09/287,001

(22) Filed: Apr. 6, 1999

(51) Int. Cl.[7] .............................. F42C 19/06; F42B 8/10; B60R 21/28
(52) U.S. Cl. .................. 102/202.9; 102/216; 102/202.5; 102/202; 102/200; 102/530; 102/531; 280/740; 280/741; 280/743.1
(58) Field of Search ..................... 280/740, 741, 280/743.1; 102/216, 202.9, 202.5, 202, 200, 530, 531

(56) References Cited

U.S. PATENT DOCUMENTS

| | | | | |
|---|---|---|---|---|
| 3,457,382 | * | 7/1969 | Boswell | 102/216 |
| 3,529,549 | * | 9/1970 | Hazelet | 102/216 |
| 3,580,176 | * | 5/1971 | Boswell | 102/216 |
| 3,685,452 | * | 8/1972 | Held | 102/216 |
| 3,858,516 | * | 1/1975 | Rabinow | 102/216 |
| 3,885,223 | * | 5/1975 | Green | 102/216 |
| 4,267,567 | | 5/1981 | Nygaard et al. | 362/46 |
| 4,831,934 | * | 5/1989 | Golay et al. | 102/216 |
| 5,012,740 | * | 5/1991 | Hardt | 102/216 |
| 5,054,395 | | 10/1991 | Vetter et al. | 102/202.3 |
| 5,350,194 | * | 9/1994 | Fohl | 280/805 |
| 5,636,865 | * | 6/1997 | Riley et al. | 280/741 |

* cited by examiner

Primary Examiner—Charles T. Jordan
Assistant Examiner—Glenda L. Sánchez
(74) Attorney, Agent, or Firm—Tarolli, Sundheim, Covell, Tummino & Szabo L.L.P.

(57) ABSTRACT

An initiator (10) comprises first and second coaxial terminals (70, 80) engageable by an electrical connector (40) to connect the terminals electrically with vehicle circuitry. Electrical insulation (100) electrically insulates between the first and second terminals (70, 80). The initiator (10) also comprises a spring (150) made of an electrically conductive material. The spring (150) has a first portion (156) electrically connected with the first terminal (70). The spring (150) has a first condition, when the first and second terminals (70, 80) are not connected with the electrical connector (40), in which a second portion (160) of the spring is in electrical contact with the second terminal, thereby shorting the initiator (10). The spring (150) has a third portion (162) which is engageable by the electrical connector (40) upon connection of the electrical connector with the first and second terminals (70, 80). The third portion (162) is moved by the electrical connector (40) to move the spring (150) from the first condition to a second condition in which the second portion (160) of the spring is spaced apart from and not in electrical contact with the second terminal (80).

9 Claims, 4 Drawing Sheets

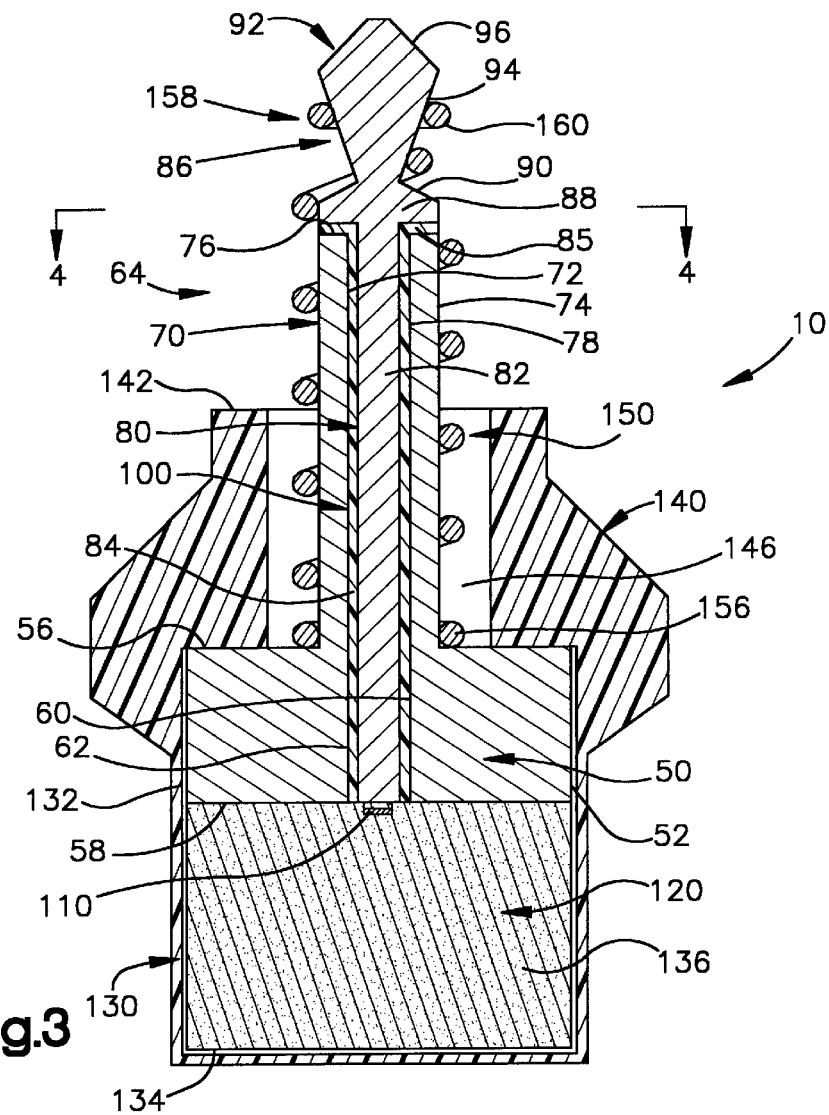
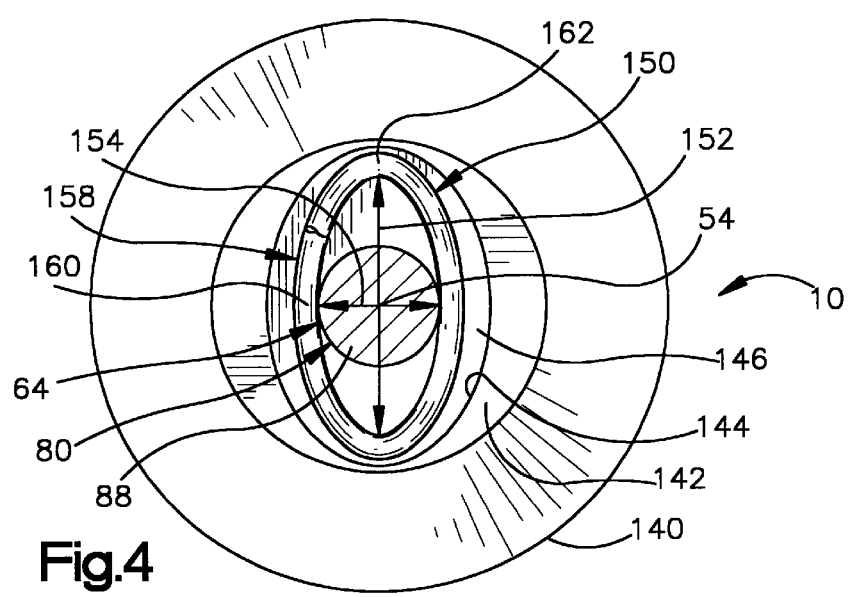

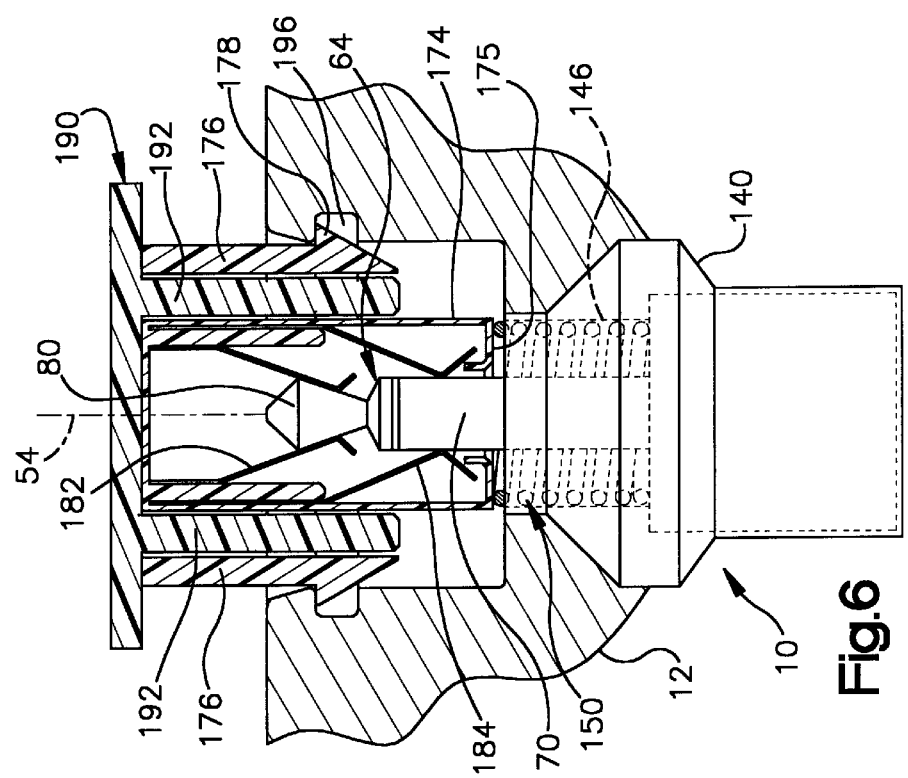
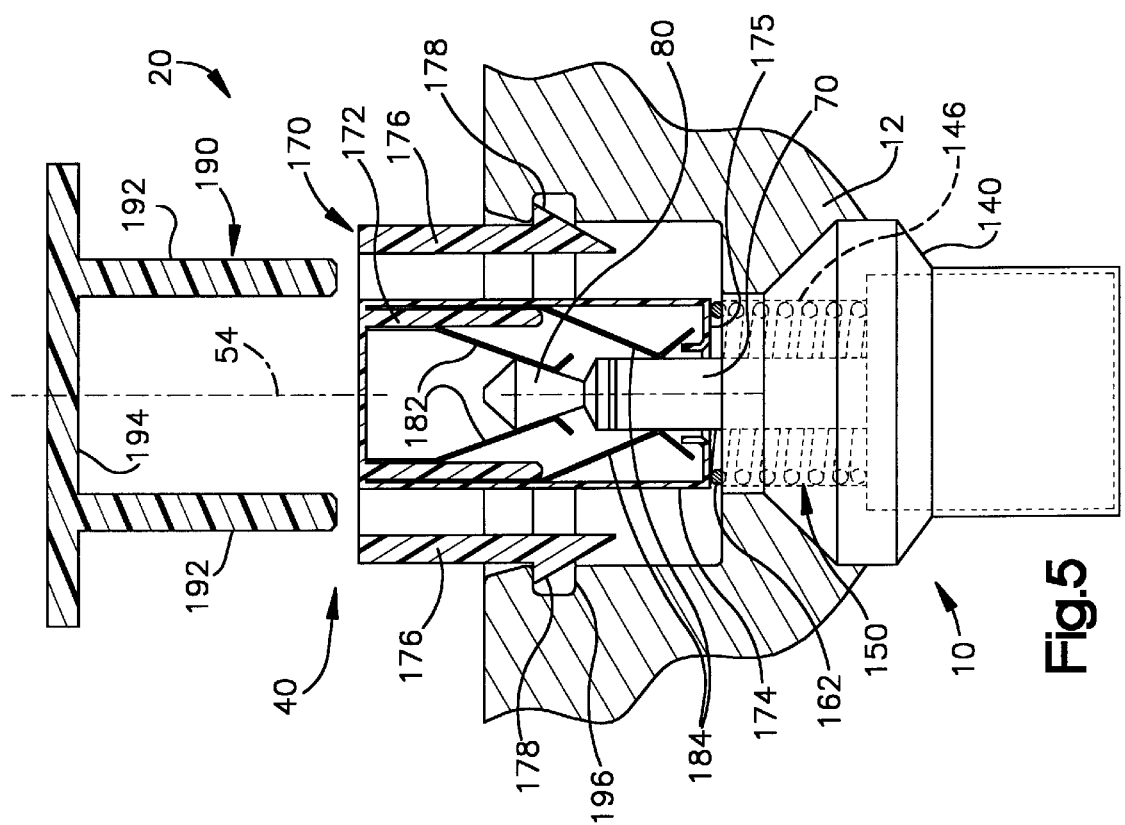

FIG. 7 is a view similar to FIG. 6 showing a three-conductor initiator in accordance with the present invention.

INITIATOR FOR AIR BAG INFLATOR

BACKGROUND OF THE INVENTION

1. Technical Field

The present invention relates to an apparatus for inflating an inflatable vehicle occupant protection device, and particularly relates to an electrically actuatable initiator for an air bag inflator.

2. Description Of The Prior Art

It is known to inflate an inflatable device, such as an air bag, to help protect a vehicle occupant in the event of an impact to the vehicle of a magnitude above a predetermined threshold. The air bag is inflated by inflation fluid from an inflator. The inflation fluid may be stored gas which is released from the inflator and/or gas generated by ignition of combustible gas generating material in the inflator.

The inflator uses an electrically actuatable initiator to open the container to release the stored gas and/or to ignite the gas generating material. It is typical to provide an electrical short circuit between the terminals of the initiator, prior to assembly of the inflator into the vehicle, to prevent accidental firing of the initiator due to stray electrical currents.

SUMMARY OF THE INVENTION

The present invention is an initiator for use in a vehicle having electric circuitry to be electrically connected with the initiator by an electrical connector. The initiator comprises first and second coaxial. terminals engageable by the electrical connector to connect the terminals electrically with the vehicle circuitry. Electrical insulation electrically insulates between the first and second terminals. The initiator also comprises a spring made of an electrically conductive material. The spring has a first portion electrically connected with the first terminal. The spring has a first condition, when the first and second terminals are not connected with the electrical connector, in which a second portion of the spring is in electrical contact with the second terminal, thereby shorting the initiator. The spring has a third portion which is engageable by the electrical connector upon connection of the electrical connector with the first and second terminals and which is moved by the electrical connector to move the spring from the first condition to a second condition in which the second portion of the spring is spaced apart from and not in electrical contact with the second terminal.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a sectional view of the initiator of FIG. 1, taken at ninety degrees to FIG. 2;

FIG. 4 is a plan view taken along line 4—4 of FIG. 3;

FIG. 5 is a sectional view of the initiator of FIG. 1 also showing an electrical connector connected with the initiator and in an unlocked condition;

FIG. 6 is a view similar to FIG. 5 showing the electrical connector in a locked condition; and, FIG. 7 is a view similar to FIG. 6 showing a three-conductor initiator in accordance with the present invention.

DESCRIPTION OF PREFERRED EMBODIMENTS

Figure 1:
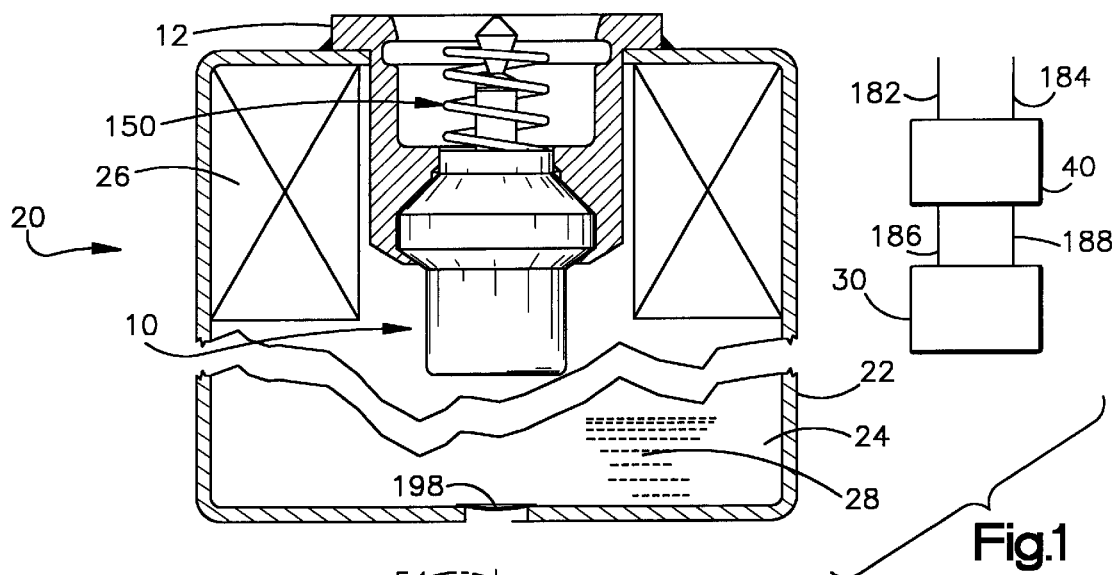
FIG. 1 is schematic view of an air bag inflator including an initiator in accordance with a first embodiment of the present invention.

The present invention relates to an electrically actuatable initiator and, preferably, to an initiator for an inflator for an inflatable vehicle occupant protection device such as an air bag. The present invention is applicable to various initiator constructions, including initiators for inflators with different modes of operation. For example, the invention can be applied to initiators for inflators that release gas from a container or inflators that generate gas by ignition of combustible gas generating material. As representative of the present invention, FIG. 1 illustrates an initiator 10 constructed in accordance with the present invention.

The initiator 10 is secured by a retainer 12 in an inflator illustrated schematically at 20. The inflator 20 includes a container 22 that defines a chamber 24 within the inflator 20. A body of pyrotechnic material indicated schematically at 26 is disposed within the chamber 24. A quantity of gas 28 such as argon or nitrogen is also disposed within. the chamber 24 in the container 22. The gas 28 is stored under pressure in the chamber 24.

The vehicle in which the inflator is mounted includes electric circuitry indicated schematically at 30 for actuating the inflator 20. The vehicle electric circuitry 30 includes a power source, which is preferably the vehicle battery and/or a capacitor, and a normally open switch. The switch is part of a sensor which senses a condition indicating the occurrence of a vehicle collision or rollover. The collision or rollover-indicating condition may be, for example, sudden vehicle deceleration caused by a collision.

The vehicle also includes an electrical connector 40 for connecting the vehicle electric circuitry 30 with the initiator 10 of the inflator 20. The electrical connector 40, shown schematically at in FIG. 1, is shown in more detail in FIGS. 5 and 6, discussed below.

Figure 2:
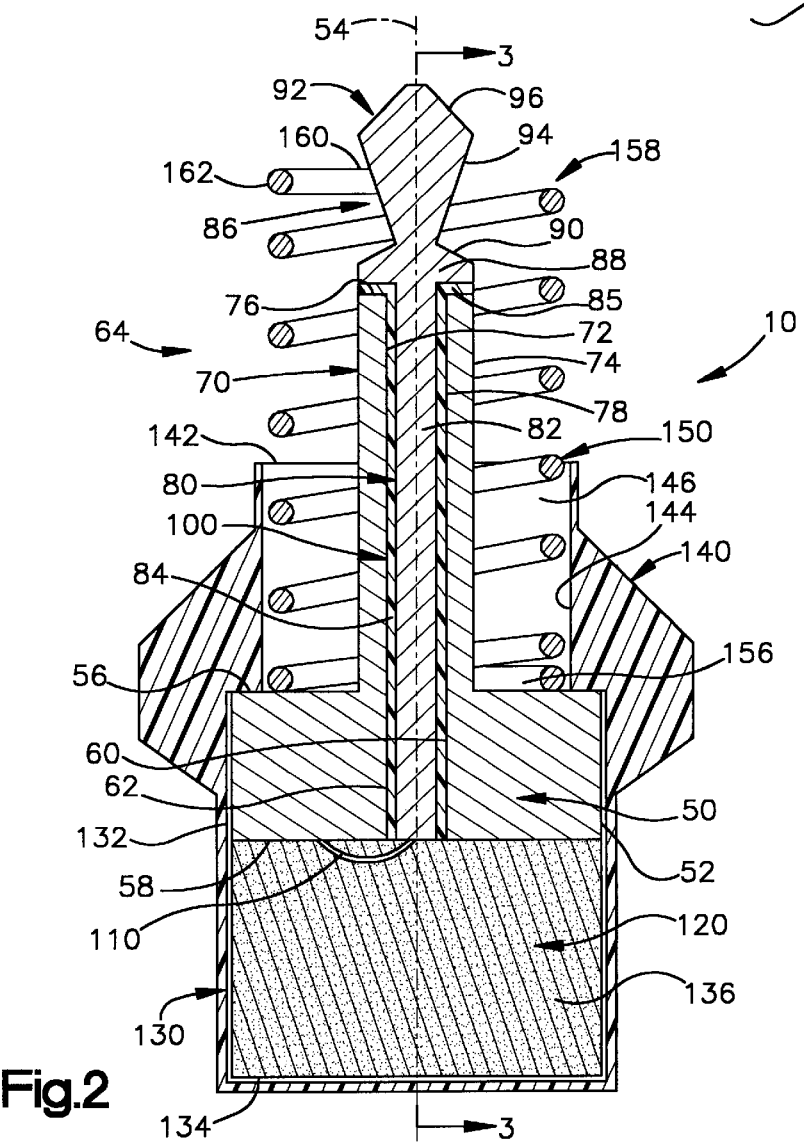
FIG. 2 is an enlarged sectional view of the initiator of FIG. 1.

The initiator 10 (FIGS. 2–4), includes a support member or header 50 which is a cylindrical metal block preferably made from stainless steel. The header 50 has a cylindrical outer side surface 52 which extends parallel to a central axis 54 of the initiator 10. The header 50 has planar, radially extending, circular end surfaces 56 and 58. A cylindrical inner surface 60 in the header 50 defines a central opening 62 extending axially through the header 50.

A connector pin 64 projects axially from the header 50. The connector pin 64 has a generally cylindrical configuration and includes first and second electrically conductive terminals 70 and 80 separated by a body of electrically insulating material 100.

The first terminal 70 projects axially from the inner end surface 56 of the header 50, and is preferably formed as one piece with the header 50. At its end opposite the header 50 the first terminal 70 has a planar, radially extending end surface 76. The first terminal 70 has a hollow, cylindrical configuration including parallel, cylindrical inner and outer side surfaces 72 and 74. The inner surface 72 of the first terminal 70 defines a cylindrical, axially extending central opening 78 which is coaxial with and merges with the central opening 62 in the header 50.

The second terminal 80 has a solid cylindrical main body portion 82 which extends through the central opening 62 in the header 50 and the central opening 78 in the first terminal 70. A hollow, cylindrical portion 84 of the body of electrically insulating material 100 is disposed between and electrically insulates between the first terminal 70 and the main body portion 82 of the second terminal 80. An annular, disc-shaped portion 85 of the body of electrically insulating material 100 extends over the radially extending end surface 76 of the first terminal 70.

An end portion 86 of the second terminal 80 project past the end of the first terminal 70. The end portion 86 includes a base portion 88 which overlies the disc-shaped portion 85 of the body of electrically insulating material 100. The base portion 88 also has a frustoconical surface 90 presented away from the header 50.

The end portion 86 of the second terminal 80 also includes a tip 92 which extends axially from the base portion 88. The tip 92 has a generally diamond-shaped configuration including a frustoconical surface 94, which extends upward and radially outward from the surface 90 and is presented toward the header 50, and another frustoconical surface 96, which extends upward and radially inward from the surface 94 and is presented away from the header. The three frustoconical surfaces 90, 94 and 96 of the second terminal 80 are all centered on the axis 54.

The initiator 10 includes a resistive element 110 (FIGS. 2 and 3) for electrically interconnecting the first and second terminals 70 and 80. The resistive element 110 is made of a known material which heats up and generates thermal energy when an electric current of a predetermined magnitude passes through the resistive element.

The initiator 10 includes an ignition charge 120 (FIG. 2) which is ignitable by the resistive element 110. The ignition charge 120 is a pyrotechnic material, such as zirconium potassium perchlorate, which ignites upon the application of sufficient thermal energy. The ignition charge 120 overlies and is in abutting engagement with the resistive element 110.

The ignition charge 120 is enclosed in a metal ignition cup 130 secured to the header 50. A body of plastic material 140 is molded around the ignition cup 120 and the header 50. The body of plastic material 140 has a radially extending upper end surface 142 located above (as viewed in FIG. 2) the end surface 56 of the header. An oval-shaped inner side surface 144 on the body of plastic material 140 is centered on and extends parallel to the axis 54 between the end surface 56 of the header 50 and the upper end surface 142 of the body of plastic material. The surface 144 defines an oval-shaped opening 146 in the body of plastic material 140 through which the connector pin 64 extends.

The initiator 10 includes a coil spring 150 for electrically shorting the initiator 10 prior to assembly of the inflator in the vehicle. The spring 150 is made from an electrically conductive material and is preferably a helical coil spring made from steel wire having a circular cross-section.

The spring 150 is coiled around the connector pin 6 and is received in the opening 146 in the body of plastic material 140. The spring 150 is formed in an ellipsoidal or oval configuration having a major diameter 152 (FIG. 4) which is substantially larger than its minor diameter 154. The minor diameter 154 of the spring 150, when the spring is in a free (unstressed) condition, is less than the outer diameter of the first terminal 70. When the spring 150 is assembled on the connector pin 64, the spring is expanded radially outward along the direction of its minor diameter 154. As a result, the spring 150 is fitted tightly over the first terminal 70. At the same time, the major diameter 152 of the spring 50 is substantially larger than the outer diameter of the connector pin 64. The coils of the spring 150 are therefore spaced apart from the connector pin 64, in the direction of the major diameter 152 of the spring (as viewed in FIG. 2).

A first portion or inner end portion 156 of the spring 150 is in abutting engagement with the outer end surface 56 of the header 50. As a result, the spring 15C is electrically connected with the header and, thereby, with the first terminal 70. The first portion 156 of the spring 150 is disposed in the oval-shaped opening 146 in the body of plastic material 140.

The spring 150 has an opposite outer end portion 158. The outer end portion 158 includes a second portion 160 and a third portion 162 of the spring 150. The second portion 160 of the spring 150 is that part of the outer end portion 158 that is in abutting engagement with the frustoconical surface 94 on the tip 92 of the second terminal 80. The second portion 160 of the spring 150 engages the tip 92 along the minor diameter 154 of the spring, the radially narrowest part of the outer end portion 158 of the spring. The third portion 162 of the spring 150 is that part of the outer end portion 158 that is spaced apart radially from the tip 92 of the second terminal 80 along the major diameter 152 of the spring.

The engagement of the second portion 160 of the spring 150 with the tip 92 of the second terminal 80 establishes electrical contact between the spring and the second terminal. As a result, when the initiator is in the condition shown in FIGS. 2 and 3, the spring 150 electrically connects the first and second terminals 70 and 80 of the initiator 10. The spring 150 electrically shorts the initiator 10 to prevent accidental firing of the initiator 10 due to stray electrical currents prior to assembly of the inflator 20 into the vehicle.

The electrical connector 40 (FIGS. 5–8) includes a generally circular body 170 that is made from an electrically insulating material, such as plastic (only portion of the connector body 170 is illustrated). The body 170 of the connector 40 includes a cylindrical, radially inner portion 172. A cylindrical spring engagement portion 174 of the connector 40 extends axially from the inner portion 172 and has an annular er surface 175. A pair of spaced, parallel locking arms 1 are disposed radially outward from and extend parallel the spring engagement portion 174. Each locking arm 17 has a locking tab 178.

The electrical connector 40 also includes a first electrical terminal which comprises a pair of electrically conductive contact arms 182. The contact arms 182 are disposed within the inner portion 172 of the body 170 of the connector 40.

The electrical connector 40 includes a second electrical terminal which comprises a second pair of electrically conductive contact arms 184. The contact arms 184 are disposed within the spring engagement portion 174 of the connector 40. The contact arms 182 and 184 are electrically connected, via lead wires shown schematically at 186 and 188, respectively, in FIG. 1, with the vehicle electric circuitry 30.

The electrical connector 40 further includes a connector position assurance member, or "CPA", 190. The CPA 190 is preferably formed as one piece with the body of the electrical connector 40, and is connected by a flexible strip or living hinge (not shown) of the plastic material of which the connector body is made. The CPA 190 includes two locking arms 192 which project from a central portion 194 of the CPA.

When the inflator 20 is assembled in the vehicle, the electrical connector 40 is physically connected with the initiator 10, as shown in FIG. 5, to establish an electrical connection between the initiator and the vehicle electric circuitry 30. As the electrical connector 40 is being moved into the position shown in FIG. 5, the spring engagement portion 174 of the connector body 170 engages the third portion 162 of the spring 150. The force of movement: of the electrical connector 40 causes the spring 150 to be compressed axially as the connector is moved into the position shown in FIG. 5.

While the spring 150 is being compressed axially, the second portion 160 of the spring is pushed axially along the outer surface of the connector pin 64, and slides along the outside of the second terminal 80. The second portion 160 of the spring 150 engages, and is expanded radially outward by, the frustoconical surface 90 on the base 88 of the second terminal 80. The second portion 160 of the spring 150 then moves off the second terminal 80 as it continues to be pushed axially. The second portion 160 of the spring 150 passes over the insulation portion 85 and into a position extending around and in electrical contact with the first terminal 70.

The coil spring 150 thus no longer establishes an electrical short circuit between the first and second terminals 70 and 80 of the initiator 10. By the time this occurs, the contact arms 182 and 184 of the first and second terminals on the electrical connector 40 are in electrical contact with the first and second terminals 70 and 80, respectively, of the initiator 110, as shown in FIG. 5.

When the electrical connector 40 is in the position shown in FIGS. 5 and 6, the locking tabs 178 on the locking arms 176 of the connector engage in a groove 196 on the inflator body. The locking tabs 178 resist movement of the electrical connector 40 out of engagement with the initiator 10. The locking tabs 178 could be disengaged, however, by a force directed inwardly (toward the axis 54) on the locking arms 176. To prevent this from happening, the CPA 190 is pressed into place in the body 170 of the connector 40 as shown in FIG. 6. The locking arms 192 of the CPA 190 are positioned between the locking arms 176 of the electrical connector 40 and the spring engagement legs 174 of the connector, and block inward movement of the locking arms 176 of the electrical connector. The CPA 190 thus prevents removal of the electrical connector 40 from the initiator 10.

If the vehicle in which the inflator 20 is mounted experiences a collision-indicating condition above a predetermined threshold, the vehicle electric circuitry 30 sends an electric current through the terminals 182 and 184 of the electrical connector 40. The current thus flows through the first and second terminals 70 and 80 of the initiator 10 and through the resistive element 110 in the initiator 10. The resistive element 110 heats up because of the electric current flowing through it and ignites the ignition charge 120. The ignition charge 120 ignites the pyrotechnic material 26 in the container 22. The pyrotechnic material 26 generates heat, as well as gas. The ignition of the ignition charge 120 also results in rupturing of a burst disk 198 (FIG. 1) of the container 22 to release the gas 28 stored in the container. The gas 28 stored in the container 22, heated and augmented by the gas generated by the pyrotechnic material 26, is directed into the air bag (not shown) to inflate the air bag.

Figure 7:
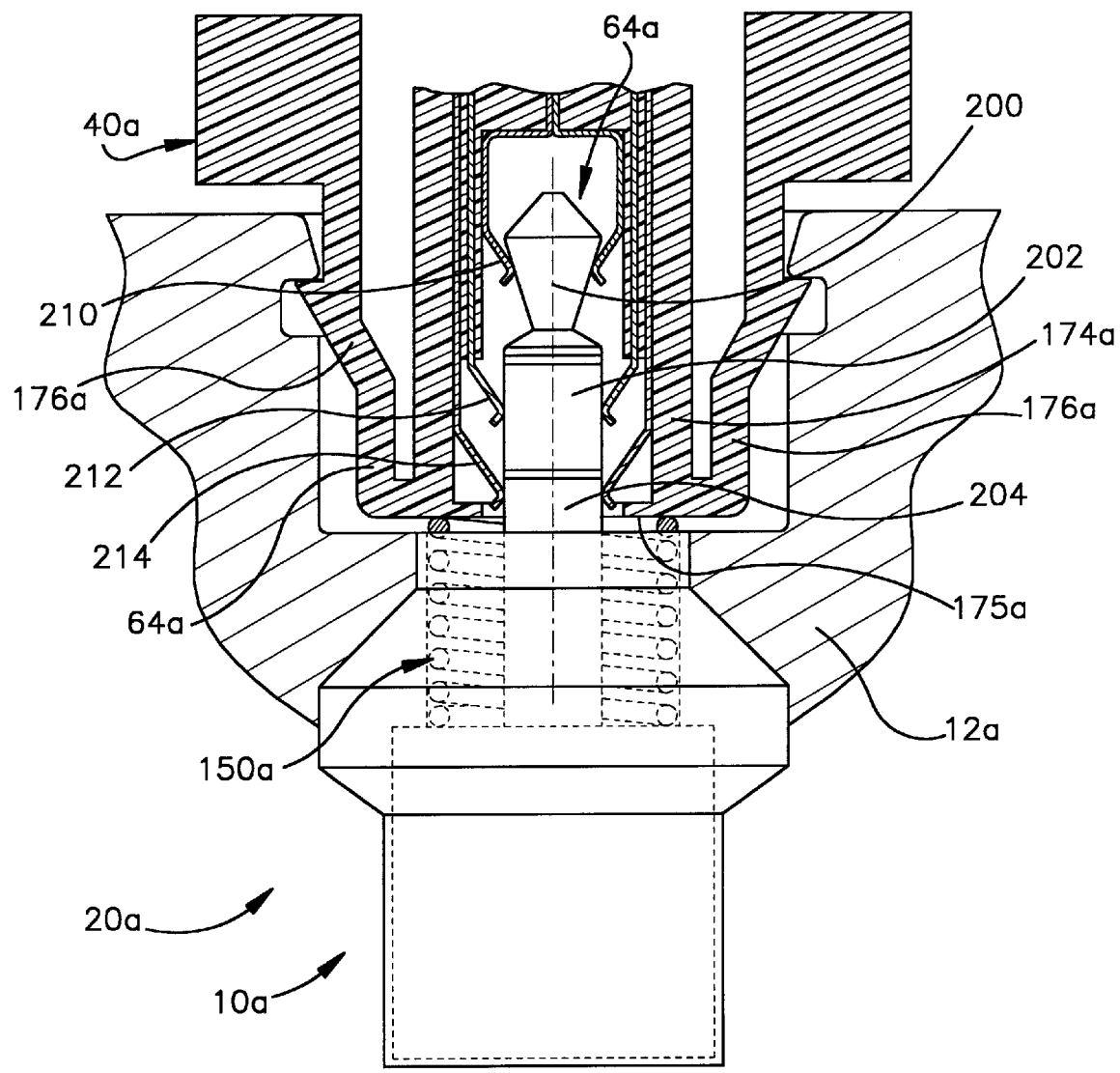

FIG. 7 illustrates portions of an inflator 20a in accordance with a second embodiment of the invention. The inflator 20a is generally similar in construction and operation to the inflator 20, and similar parts are given the same reference numerals with the suffix "a" attached.

The inflator 20a includes an initiator 10a having three terminals 200, 202 and 204 on a single pin 64a. The connector 40a has three pairs of contact arms 210, 212 and 214 for engagement with the three terminals 200, 202 and 204 of the initiator 10a. The connector 40a also has two locking arms 176a which are directly connected with the spring engagement portion 174a of the connector The locking arms 176a extend radially outward and upward from the spring engagement portion 174a of the connector 40a. The initiator 10a includes a coil spring 150a which functions to short all three terminals 200, 202 and 204 of the initiator when the electrical connector 40a is not engaged as shown in FIG. 7.

From the above description of the invention, those skilled in the art will perceive improvements, changes and modifications in the invention. Such improvements, changes and modifications within the skill of the art are intended to be covered by the appended claims.

Having described the invention, I claim:

1. An initiator for use in a vehicle having electric circuitry to be electrically connected with said initiator by an electrical connector, said initiator comprising:

first and second coaxial terminals engageable by the electrical connector to connect said terminals electrically with the vehicle circuitry;

electrical insulation electrically insulating between said first and second terminals; and a spring made of an electrically conductive material, said spring having a first portion electrically connected with said first terminal;

said spring having a first condition, when said first and second terminals are not connected with said electrical connector, in which a second portion of said spring is in electrical contact with said second terminal thereby shorting said initiator;

said spring having a third portion which is engageable by the electrical connector upon connection of said electrical connector with said first and second terminals and which is moved by the electrical connector to move said spring from the first condition to a second condition in which said second portion of said spring spaced apart from and not in electrical contact with said second terminal.

2. An initiator as set forth in claim 1 wherein said first and second terminals of said initiator are coaxial on an axis of said initiator, said spring having a non-circular configuration centered on said axis.

3. An initiator as set forth in claim 2 wherein said spring has an oval configuration.

4. An initiator as set forth in claim 3 wherein said second terminal of said initiator has a cylindrical outer surface extending parallel to said axis, said spring having a major diameter and a minor diameter, said minor diameter of said spring when relaxed being less than the diameter of said cylindrical outer surface of said second terminal.

5. An initiator as set forth in claim 3 wherein said spring has a major diameter and a minor diameter, said second portion of said spring engaging said second terminal of said initiator along said minor diameter of said spring.

6. An initiator as set forth in claim 1 wherein said second terminal of said initiator has a tip port which projects past said first terminal of said initiator, said second portion of said spring engaging said tip portion of said second terminal of said initiator.

7. An initiator as set forth in claim 1 wherein said second terminal of said initiator has a frustoconical surface presented toward said first portion of said spring, said second portion of said spring engaging said frustoconical surface to establish electrical contact with said second terminal of said initiator.

8. An initiator as set forth in claim 1 wherein said spring is a coil spring.

9. An initiator as set forth in claim 8 wherein said coil spring is centered on an axis of said initiator and has an oval configuration.

* * * * *